US006959752B2

(12) United States Patent
Huang

(10) Patent No.: US 6,959,752 B2
(45) Date of Patent: Nov. 1, 2005

(54) COLLAPSIBLE AUTO SHADE

(76) Inventor: Sunny en Liung Huang, 786 Via Monte Video, Burbank, CA (US) 91711

( * ) Notice: Subject to any disclaimer, the term of this patent is extended or adjusted under 35 U.S.C. 154(b) by 0 days.

(21) Appl. No.: 10/769,254

(22) Filed: Jan. 30, 2004

(65) Prior Publication Data

US 2004/0182530 A1 Sep. 23, 2004

Related U.S. Application Data

(63) Continuation-in-part of application No. 10/735,967, filed on Dec. 15, 2003, which is a continuation-in-part of application No. 10/610,848, filed on Jun. 30, 2003, now abandoned, which is a continuation-in-part of application No. 10/448,621, filed on Jun. 2, 2003, which is a continuation-in-part of application No. 10/307,482, filed on Dec. 2, 2002, now abandoned, which is a continuation-in-part of application No. 10/116,946, filed on Apr. 8, 2002, now Pat. No. 6,691,762, which is a continuation-in-part of application No. 09/766,557, filed on Jan. 19, 2001, now Pat. No. 6,561,257, which is a continuation of application No. 09/417,277, filed on Oct. 13, 1999, now Pat. No. 6,192,967, said application No. 10/307,482, filed on Dec. 2, 2002, is a continuation-in-part of application No. 10/118,549, filed on Apr. 8, 2002, now Pat. No. 6,705,381, and a continuation-in-part of application No. 09/766,557, filed on Jan. 19, 2001, which is a continuation of application No. 09/417,277, filed on Oct. 13, 1999.

(60) Provisional application No. 60/104,703, filed on Oct. 19, 1998, and provisional application No. 60/284,967, filed on Apr. 19, 2001.

(51) Int. Cl.$^7$ .................................................. B60J 3/00

(52) U.S. Cl. .............................. 160/370.23; 160/84.07; 160/DIG. 18

(58) Field of Search ..................... 160/370.23, 84.07, 160/DIG. 18, 134, DIG. 2, DIG. 3, 84.03; 296/97.8, 97.7

(56) References Cited

U.S. PATENT DOCUMENTS

| | | |
|---|---|---|
| 1,475,647 A | 11/1923 | Naterman |
| 1,732,447 A | 10/1929 | Crane |
| 1,790,333 A | 1/1931 | Tubman |
| 1,808,652 A | 6/1931 | Gump |
| 2,065,242 A | 12/1936 | Omerly, Jr. |
| 2,489,901 A | 11/1949 | Kocinski |
| 2,596,836 A | 5/1952 | Bruhl |
| 2,598,770 A | 6/1952 | Drozt |
| 2,599,066 A | 6/1952 | Osborn |
| 2,614,630 A | 10/1952 | Moszelt |
| 2,751,977 A | 6/1956 | Pinkerton |
| 2,843,421 A | 7/1958 | Shelton |
| 2,979,129 A | 4/1961 | Ketchum |
| 3,046,048 A | 7/1962 | Cheney |
| 3,184,264 A | 5/1965 | Ealey |
| 3,336,969 A | 8/1967 | Marchman |

(Continued)

FOREIGN PATENT DOCUMENTS

| | | |
|---|---|---|
| FR | 1256866 | 2/1961 |
| IT | 689866 | 4/1965 |

*Primary Examiner*—David Purol
(74) *Attorney, Agent, or Firm*—Paul M Denk

(57) ABSTRACT

A collapsible automobile shade is described that includes a body comprising at least one material portion, the body having a front side, a back side and a peripheral portion defining an outer edge that extends along a circumference of the material portion, at least one closure apparatus attached to the back side of the body, the closure apparatus being positioned along a midline of the body and extending between the outer edge of the body, wherein the closure apparatus is adapted to support the body in an open configuration when the closure apparatus in a closed position, and wherein the closure apparatus is adapted to allow the body to be in a collapsed configuration when the closure apparatus is in an open position.

10 Claims, 2 Drawing Sheets

U.S. PATENT DOCUMENTS

| | | | |
|---|---|---|---|
| 3,373,792 A | | 3/1968 | Lessard |
| 4,137,683 A | * | 2/1979 | Pfeiffer .................... 52/506.08 |
| 4,227,542 A | | 10/1980 | Bonfilio |
| 4,332,414 A | | 6/1982 | Surtin |
| 4,560,245 A | | 12/1985 | Sarver |
| 4,606,572 A | | 8/1986 | Maguire |
| 4,620,749 A | | 11/1986 | McEachern |
| 4,652,039 A | | 3/1987 | Richards |
| 4,671,558 A | | 6/1987 | Cline |
| 4,681,149 A | | 7/1987 | Tung-Chow |
| 4,699,195 A | | 10/1987 | Lester |
| 4,736,980 A | | 4/1988 | Eubanks |
| 4,763,947 A | | 8/1988 | Gregg |
| 4,784,215 A | | 11/1988 | Sing |
| 4,790,591 A | | 12/1988 | Miller |
| 4,818,007 A | | 4/1989 | Mahoney |
| D301,449 S | | 6/1989 | Silva |
| 4,861,090 A | | 8/1989 | Gavrieli |
| 4,862,943 A | | 9/1989 | Shafia |
| 4,886,104 A | * | 12/1989 | Eldridge, Jr. .......... 160/370.23 |
| 4,913,211 A | * | 4/1990 | Eskandry et al. ......... 160/84.04 |
| 5,010,939 A | | 4/1991 | King |
| 5,024,262 A | | 6/1991 | Huang |
| 5,035,460 A | | 7/1991 | Huang |
| 5,158,127 A | * | 10/1992 | Schumacher ............. 160/84.07 |
| 5,207,257 A | | 5/1993 | Rupel et al. |
| 5,333,665 A | * | 8/1994 | Safar ...................... 160/84.05 |
| 5,553,908 A | | 9/1996 | Shink |
| 5,598,883 A | * | 2/1997 | Platsis ................... 160/370.23 |
| 5,628,357 A | | 5/1997 | Hwang |
| 5,657,810 A | | 8/1997 | Levy et al. |
| 5,660,220 A | | 8/1997 | Ruan |
| 5,687,786 A | | 11/1997 | Tsai |
| 5,694,998 A | | 12/1997 | Chen |
| 5,765,619 A | | 6/1998 | Arnold |
| 5,845,697 A | | 12/1998 | Zheng |
| 5,967,161 A | | 10/1999 | Neal |
| 6,192,967 B1 | | 2/2001 | Huang |
| 6,491,052 B1 | | 12/2002 | Zheng |

* cited by examiner

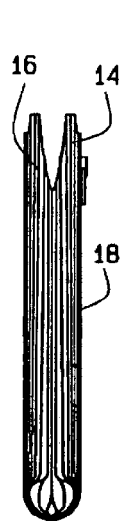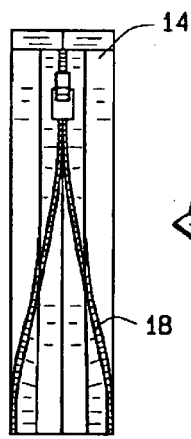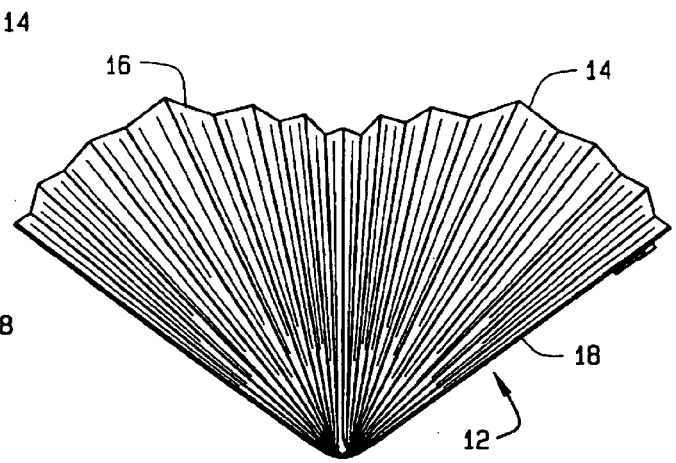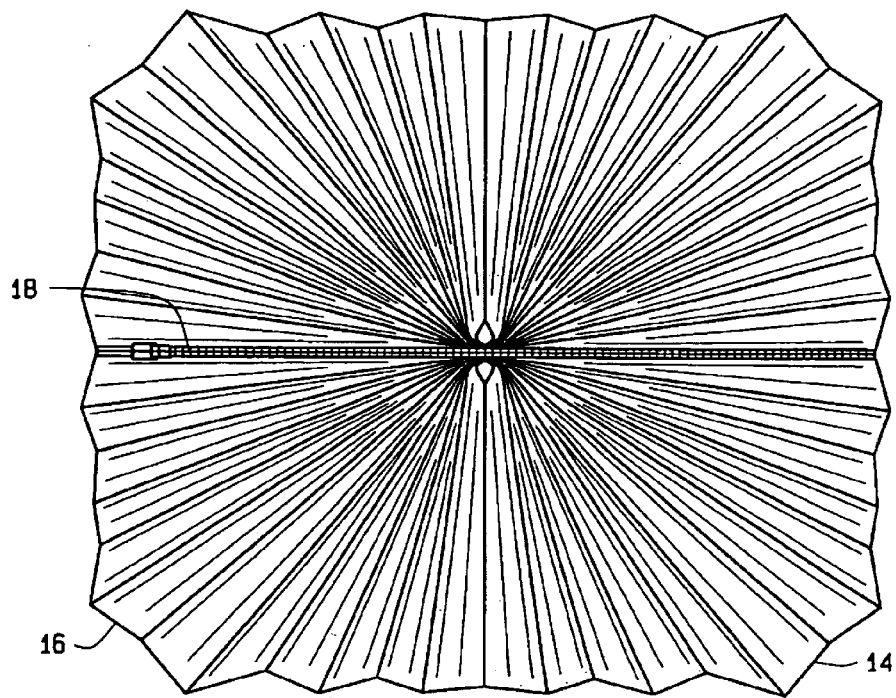
FIG. 4
FIG. 1
FIG. 2
FIG. 3

COLLAPSIBLE AUTO SHADE

CROSS-REFERENCE TO RELATED APPLICATIONS

This is a continuation-in-part of application filed Dec. 15, 2003, having Ser. No. 10/735,967, which is a continuation-in-part of application having Ser. No. 10/610,848, which was filed on Jun. 30, 2003 now abandoned, which is a continuation-in-part of application having Ser. No. 10/448,621, which was filed on Jun. 2, 2003, which is a continuation-in-part of application having Ser. No. 10/307,482 filed Dec. 2, 2002 now abandoned, which is a continuation-in-part of application Ser. No. 10/116,946 filed Apr. 8, 2002 now U.S. Pat. No. 6,691,762 which is a continuation-in-part of application Ser. No. 09/766,557 filed Jan. 19, 2001, now U.S. Pat. No. 6,561,257, which is a continuation of application Ser. No. 09/417,277, filed Oct. 13, 1999, now U.S. Pat. No. 6,192,967, which claims benefit of provisional application Ser. No. 60/104,703, filed Oct. 19, 1998. Application Ser. No. 10/307,482, noted above, also is a continuation-in-part of Ser. No. 10/118,549 filed Apr. 8, 2002 now U.S. Pat. No. 6,705,381, which claims priority to provisional application Ser. No. 60/284,967 filed Apr. 19, 2001 and a continuation-in-part of application Ser. No. 09/766,557 filed Jan. 19, 2001, now U.S. Pat. No. 6,561,257, which is a continuation of application Ser. No. 09/417,277, filed Oct. 13, 1999, now U.S. Pat. No. 6,192,967, which claims benefit of provisional application Ser. No. 60/104,703, filed Oct. 19, 1998. All of the above noted applications and patents are incorporated herein by reference.

BACKGROUND OF THE INVENTION

The present invention relates generally to collapsible shades designed for use in windows or doors, such as automobile windows and doors, to protect the interior by preventing damaging sunrays from entering.

Numerous styles of window screens and shades adapted for use in automobiles are available in the art. For example, U.S. Pat. No. 5,035,460 for an automobile window protector, which is incorporated herein by reference, shows the fabrication of such a screen, made of flexible material, which could be applied to either the interior or the exterior of the window of an automobile. While prior art shades have been successfully used to block sunlight, storage of the shades inside automobiles has been inconvenient. A driver who desires to use a sunshade is often required to exit the automobile to retrieve the sunshade from a storage location that is inconveniently located outside of the automobile. Because of this inconvenience, many drivers do not regularly use a sunshade, which over time results in sun damage.

Accordingly, there is a need for a collapsible or folding window shade that may be conveniently stored in a confined area, such as the interior of an automobile that can be expanded to adequately block the sun.

BRIEF SUMMARY OF THE INVENTION

Briefly stated, in a first aspect of the invention, a collapsible automobile shade is provided, which can be selectively moved between a collapsed position for storage and an open position for placement in a window. The shade comprises a body that comprises at least one material portion. The body has a front side, a backside and a peripheral portion defining an outer edge that extends along a circumference of the material portion. At least one closure apparatus is attached to the backside of the body, and positioned along a midline of the body extending between the outer edges of the body. The closure apparatus is adapted to support the body in an open configuration when the closure apparatus is in a closed position, but allows the body to be in a collapsed configuration when in an open position.

In a second aspect of the invention, a collapsible automobile shade is provided that comprises a body. The body comprises at least one material portion, and has a peripheral portion defining edges about the periphery of the body. A first support member is attached to a first side edge, and a second support member is attached to a second side edge. At least one magnet is in operable contact with the first support member, and at least one magnet is in operable contact with the second support member. The first and second support members are adapted to support the body in an open configuration when the magnets are in operable contact with each other.

The features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is side view of one embodiment of the collapsible automobile shade of the present invention, illustrating one embodiment of a zipper closure apparatus in a closed configuration;

FIG. 2 is a perspective view of the back side of the collapsible shade of FIG.1 , with a generally rectangular screen, illustrating the transition of the shade from a collapsed configuration to an open configuration;

FIG. 3 is a plan view of the collapsible shade of FIG.1, illustrating the shade in an open configuration;

FIG. 4 is a perspective view of the collapsible shade of FIG. 1, illustrating another view of the shade in a collapsed configuration;

Corresponding reference numerals indicate corresponding parts throughout the several drawings.

DESCRIPTION OF THE PREFERRED EMBODIMENT

Figure 5:
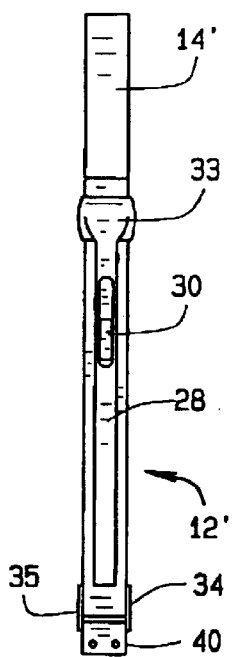
FIG. 5 is a side view of an alternative embodiment of the collapsible shade of the invention, in a collapsed configuration.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

With reference to FIGS. 1–7, a new and nonobvious collapsible shade 12 is disclosed. With particular reference to FIGS. 1–4, one embodiment of collapsible shade 12 comprises a body or screen portion 14 that comprises at least one material portion. The material portion may comprise a fabric-like material, which may be cloth, mesh, polymer, or even a strong polyester film, such as Mylar®, which is commercially available from DuPont Teijin Films. Body 14 comprises at least one material portion, and includes a front side, a backside and a peripheral portion defining an outer edge 16 that extends along the circumference of body 14.

At least one closure apparatus 18 is attached to the backside of body 14. The closure apparatus 18 is positioned along a midline or center of body 14 and extends between the outer edges 16 of body 14. Closure apparatus 18 may be attached to the body 14 by any known means of accomplishing such. Closure apparatus 18 may be sewed to the body 14, glued onto body 14, or integrated into body 14 in accordance with the invention. The mechanism for attaching closure apparatus 18 to body 14 will be readily apparent to a person of ordinary skill in the art without undue experimentation.

Closure apparatus 18 is adapted to support body 14 in an open configuration, as shown in FIG. 3, when in a closed position. Closure apparatus 18 is adapted to allow body 14 to be in a collapsed or partially collapsed configuration, as shown in FIGS. 1, 2 and 4. Closure apparatus 18 may be any closure apparatus capable of accomplishing such. In a specific embodiment of the invention, and with reference to FIGS. 1–4, however, closure apparatus 18 is a zipper. In another specific embodiment of the invention, closure apparatus 18 is a hook and loop fastener, such as Velcro®, which is commercially available from Velcro Industries B.V. With reference to FIG. 3, and in a specific embodiment of the invention, the shade 12 of the invention comprises a second material portion.

Figure 6:
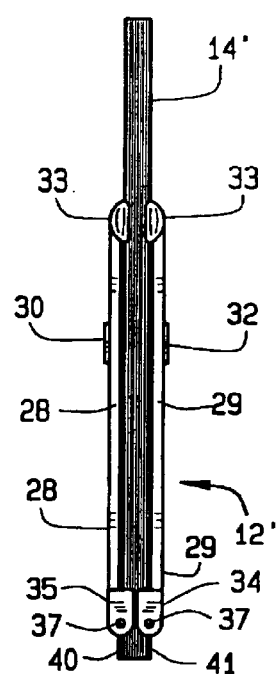
FIG. 6 is a front view of the shade of FIG. 5, illustrating the shade in a closed configuration.
Figure 7:
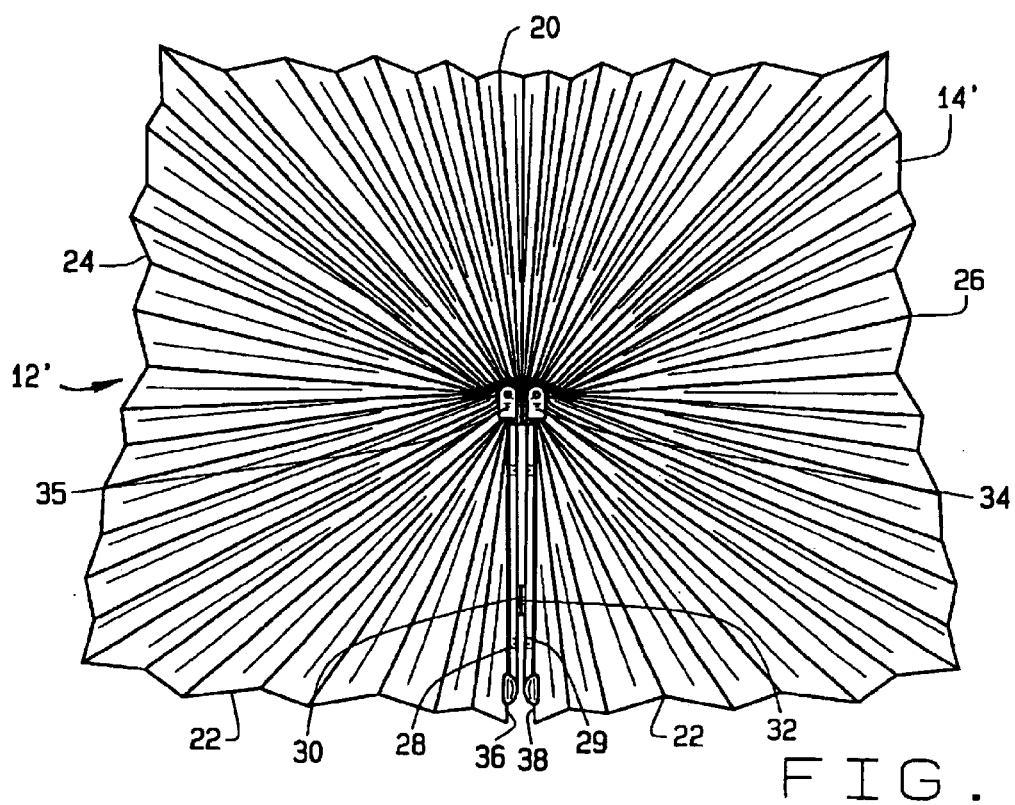
FIG. 7 is a plan view of the shade of FIG. 5, illustrating the shade in an open configuration.

In a second embodiment of the invention, the collapsible shade 12', illustrated in FIGS. 5–7, comprises a body 14' comprising one or more material portions, and having outer edges about the periphery of body 14'. The edges are loosely divided into several regions for demonstrative purposes. Those regions include a top edge 20, a bottom edge 22, side edges 24 and 26, and inside edges 36 and 38. A first rigid support member 28 is attached to inside edge 36 and a second rigid support member 29 is attached to inside edge 38. At least one magnet 30 is in operable contact with the first support member 28, and at least one magnet 32 is in operable contact with the second support member 29. Magnets 30 and 32 are of opposite polarity and are mounted to their support members 28 and 29 and that they contact each other when the shade 12' is opened as seen in FIG. 7. The first support member 28 and the second support member 29 are adapted to support the body 14' in an open configuration, as shown in FIG. 7. The magnets 30 32 are sufficiently strong to maintain the shade 12' in the opened position against any memory of the material of the body 14' to return to the collapsed portion. Shade 12' is converted from the closed configuration illustrated in FIGS. 5 and 6 to the open configuration illustrated in FIG. 7 by pivoting support members 28 and 29 about a pivot point 37 within support members 28 and 29 until the support members 28 and 29 meet and material portion 14' is fully opened, as illustrated in FIG. 7. Pivot point 37 may comprise a pin, screw, or other mechanism for establishing a pivot point.

In the specific embodiment of the invention illustrated in FIGS. 5 and 6, supporting members 28 and 29 comprise shoulder portions 33 that are adapted to enclosed the material portion 14' when pleated and in a closed configuration. Shoulder portions 33 comprise a channel for receiving the material portion 14', which has a width about as wide as the width of the material portion 14' when pleated and in a folded configuration. Therefore, shoulder portions 33 are generally wider than the width of the material portion 14' when in a closed and pleated configuration. In this embodiment of the invention, supporting members 28 and 29 also comprise base portions 34 and 35. Base portions 34 and 35 also comprise a channel therein to receive material portion 14', which has a width about as wide as the width of material portion 14' when in a folded configuration. Base portions 34 and 35, therefore, are generally wider than the width of material portion 14' when in a closed and pleated configuration. Base portions 34 and 35 are operatively connected to the shade 12'. As seen in FIG. 6, the bottom or center of the shade 12' is folded and compressed. Hinge members 40,41 are positioned on opposite sides of the compressed shade 12', at the bottom or center thereof, and are connected together, for example by fasteners (such as rivets) which extend through the compressed shade 12' to hold the hinge members 40,41 together and to retain the bottom, or center, of the shade 12' in the compressed state, as seen in FIG. 6. The pins 37 extend outwardly from the hinge members 40,41 to hingedly and pivotally connect the base portions 34, 45 to the hinge members 40, 41, respectively.

In certain embodiments of the invention, illustrated in FIGS. 5-7, the material from which body 14' is made is pleated to facilitate transition of the shade 12' between the opened configuration, illustrated in FIG. 7, and the closed configuration illustrated in FIGS. 5 and 6. In this embodiment of the invention, body 14' is configured to fold in a conventional manner along the seams. When shades 12 and 12' are expanded, as shown in FIGS. 3 and 7, body 14 and 14' are held in an open configuration. When body 14 and 14' are in an open configuration, shades 12' and 12 can be used as a sunshade or privacy screen. Outer edges 16 define a perimeter boundary or border, which in an illustrative embodiment is made from simply rolling the outer edge 16 back on itself and securing the edge by sewing.

It will be recognized by those of ordinary skill in the art that the particular shape of body 14 may undertake various configurations, and such shapes may include the rectangular form, as shown in FIGS. 3 and 7, or a square, oval, circular, or truncated configuration. The shape chosen is dependent upon the particular window or opening for which shade 12 is intended for use.

To use shade 12 of the invention, shade 12 is initially unfolded or expanded to a fully open configuration by closing closure device 18. In embodiments where closure device 18 is a zipper, as illustrated in FIGS. 1–4, the zipper is simply zipped closed. This closure will act to support shade 12 in a fully open configuration, as shown in FIG. 3. Preferably, shade 12 is selected to include a body 14 having overall dimensions equal to or smaller than those of the frame of the window or opening in which it is to be installed. Shade 12 is then simply placed in the window or opening. To store shade 12, closure device 18 is released or opened. In embodiments where the closure device is a zipper, the zipper is unzipped.

To use the shade 12' that is illustrated in FIGS. 5–7, the shade 12' is initially unfolded or expanded to be fully open 4, as shown in FIG. 7, by initially spreading support members 28 and 29 apart about a pivot that lies approximately in the center of body 14 at the top edges of support members 28 and 29, and bringing support members 28 and 29 together such that the magnets 30 and 32 therein are attracted to and draw each other. Magnets 30 and 32 will act to maintain shade 20 in an open configuration until the attraction between magnets 30 and 32 is broken. The attraction may be broken by force, i.e. by bringing support members 28 and 29, and therefore, magnets 30 and 32, apart or away from each other.

To facilitate holding shade 12 in a vehicle window, door or other opening, and in one embodiment of the invention, one or more mounting elements may be utilized. Preferably, a plurality of mounting elements is disposed in a spaced relationship about the outer edges 16 of shade 12, at each corner of body 14. Shade 12 may also be held in place by tension or friction forces. For example, an automobile's visors may be placed over the upper portions of shad 12 inside the automobile's window.

During use, when shade 12 is in an open configuration, and placed in a window, door, or other opening, the friction surface on each mounting element seats against the framework surrounding the window to provide a positive contact against which shade 12 can exert a holding force to maintain shade 12 in place adjacent the window.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A collapsible automobile shade comprising:
   a body comprising at least one material portion, the body having a front side, and back side, and a peripheral portion defining outer side edges that extend along a circumference of the material portion;
   said body being formed of approximate halves, each approximate half of the body capable of pivoting at a midpoint, approximately 180° degrees, to allow each half to be folded over upon itself into a collapsed configuration where both halves, when contracted, are disposed in adjacency and engaged for holding the shade in its closed condition, and wherein each approximate half of the body is capable of being unfolded 180° degrees into its opened configuration, with the side edge of each half being in adjacency;
   at least one closure apparatus attached to the adjacent side edges of each body half, the closure apparatus being positioned along a midline of the body between approximate halves and extending between the outer side edges of the body;
   wherein the closure apparatus is adapted to support the body in an opened configuration when the closure apparatus is in an engaged position, to hold the shade in an expanded condition, and wherein the closure apparatus is adapted to allow the body to be in a collapsed configuration, when the closure apparatus is in an unengaged position.

2. The collapsible automobile shade of claim 1 wherein the closure apparatus is a zipper.

3. The collapsible automobile shade of claim 1 wherein the closure apparatus comprises at least one magnet.

4. The collapsible automobile shade of claim 1 wherein the body is adapted to fold each of its halves in a conventional manner along a central seam disposed at the adjacent edges of each half of the body portion.

5. A collapsible automobile shade comprising:
   a body comprising at least one material portion, the body having a peripheral portion defining a top edge, a bottom edge, and first and second side edges;
   a first support member attached to the first side edge;
   a second support member attached to the second side edge;
   at least one first magnet in operable contact with the first support member;
   at least one second magnet in operable contact with the second support member;
   wherein the first and second support members are adapted for each pivoting approximately 180° degrees for holding said collapsible automobile shade into its expanded and opened state, wherein the magnets are in operable contact with each other to hold the shade in its expanded state, and wherein said first and second support members are adapted for each pivoting approximately 180° degrees in an opposite direction to provide a collapsed state for the automobile shade.

6. The collapsible automobile shade of claim 5 further comprising a fastener adapted to hold the at least one magnet in operable contact with the first support member and the at least one magnet in operable contact with the second support member and in operable contact with each other.

7. The collapsible automobile shade of claim 5 further comprising a closure device.

8. The collapsible automobile shade of claim 5 further comprising a mounting device.

9. The collapsible automobile shade of claim 5 comprising a second material portion.

10. The collapsible automobile shade of claim 5 wherein the body is adapted to fold in a conventional manner along pleats disposed about the at least one material portion.

* * * * *